Dec. 27, 1966     L. J. SUNDBLOM     3,294,032

METERING PUMP

Filed June 15, 1964     2 Sheets-Sheet 1

INVENTOR.
LEIF J. SUNDBLOM
BY
*Mellin, Moore & Weissenberger*
ATTORNEYS

Dec. 27, 1966   L. J. SUNDBLOM   3,294,032
METERING PUMP
Filed June 15, 1964   2 Sheets-Sheet 2

INVENTOR.
LEIF J. SUNDBLOM
BY
Mellin, Moore + Weissenberger
ATTORNEYS

United States Patent Office 3,294,032
Patented Dec. 27, 1966

3,294,032
METERING PUMP
Leif J. Sundblom, Castro Valley, Calif., assignor to Rockwell Manufacturing Company, San Leandro, Calif., a corporation of Pennsylvania
Filed June 15, 1964, Ser. No. 375,029
4 Claims. (Cl. 103—160)

This invention concerns metering pumps, and more particularly miniature rotary pumps which are designed to rotate very slowly and deliver minute but accurately measured quantities of fluid with a minimum of drive power.

In certain mechanical devices, such as positive displacement liquid or gas meters and turbine type liquid or gas meters, the bearings on rotating members or gear trains are of necessity placed inside a pressure vessel and are completely surrounded by liquid or gas. Many of these liquids and certainly the gases have little or no lubricity. It is therefore very desirable that a small amount of lubricant be supplied to these bearings or gears.

The so-called sealed lubricated bearings are seldom sealed sufficiently well to prevent washing out of the lubricant. The well sealed bearings develop enough running friction to prevent their use in devices of the character described above. Some gas meters are provided with a sump in which a certain quantity of lubricant is initially placed, and this lubricant is splashed onto gears and bearings. The lubricant, however, is often washed out or diluted by condensates which collect and pass through the meter. The lubricant sump also collects contaminants, such as iron oxides, which become trapped in the fluid and act as abrasives.

The device of this invention overcomes these difficulties by providing a miniature pump which is completely sealed and self-contained so that it can be operated entirely within a closed pressure chamber filled with liquid or gas, yet requires so little drive power that it can be driven by a gas or liquid meter mechanism without impairing its functioning. In addition, the device of this invention pumps an accurately measured, minute amount of lubricant to each of one or more outlets with each revolution, so that any precise amount of lubrication can be accurately distributed to one or more bearings by an appropriate choice of reduction gearing and pump parameters. The inventive device, due to its simplicity, is also sufficiently inexpensive to usually be insignificant from an economic point of view.

It is therefore the object of this invention to provide a miniature low-pressure metering pump capable of accurately pumping minute quantities of fluid at a very slow rate.

It is another object of the invention to provide a pump of the type described having a minimum of internal friction and a minimum of parts.

It is a further object of the invention to provide a pump of the type described which can accurately distribute fluid from a single pumping element to a plurality of outlets regardless of any difference in load resistance at different outlets.

These and other objects will become apparent from a perusal of the following specification taken in connection with the accompanying drawings, in which.

FIGS. 4 through 9 schematically illustrate the operational sequence of one form of the device; and FIGS. 10 through 16 illustrate the operational sequence of another form of the device.

Basically, the device accomplishes its pumping action by providing a rotating fluid cylinder which during its rotation communicates alternatively with one or more inlet ports or recesses and one or more outlet ports or recesses, and a piston in the cylinder which is cammed to draw fluid into the cylinder when it communicates with the inlet ports, and to push fluid out of the cylinder when it communicates with the outlet ports. In the preferred embodiment of the invention, the cylinder is resilient to compensate for the slight volume change caused by the motion of the piston between ports. This resiliency permits the piston to be cammed for simple sinusoidal reciprocation for ease of manufacture and minimum wear.

Figure 1:
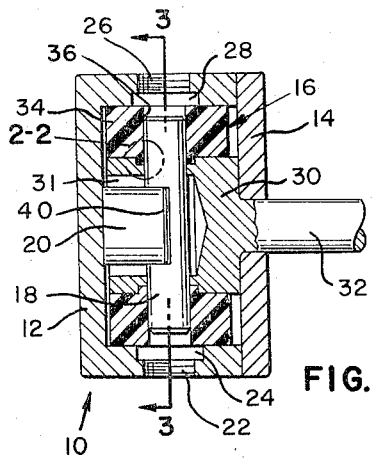
FIG. 1 is a vertical section of the device along the rotor axis.

Referring now to FIG. 1, the pump 10 consists of a housing 12, an end cap 14, a rotor 16, a piston 18, and a stationary cam or eccentric pin 20 attached to housing 12. In practice, the housing 12 is rigidly held against rotation and end cap 14 is attached to housing 12.

Figure 3:
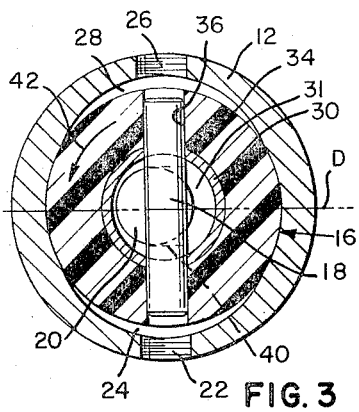
FIG. 3 is a vertical section of the device along line 3—3 of FIG. 1.

Housing 12, as seen in FIGS. 1 and 3, has an inlet passage 22 which connects with an arcuate inlet port 24. Housing 12 also has an outlet passage 26 which connects with an arcuate outlet port 28.

Rotor 16 consists of a metal core 30 having an axial bore 31 and an integral drive shaft 32. A resilient rubber-like jacket 34 is molded on and permanently bonded to the metal core 30. This resilient jacket 34 closely fits the inside diameter of housing 12 in sealing relationship therewith. An accurately cored aperture passes directly through the center of metal core 30 and resilient jacket 34 in a direction normal to their axis, as shown in FIGS. 1 and 3, and this aperture becomes the displacement cylinder 36.

Figure 2:
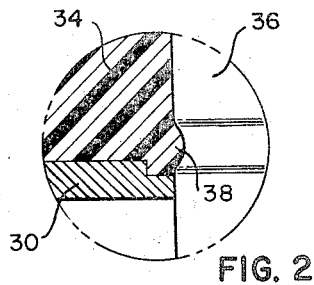
FIG. 2 is a detail section of the rotor in the circle 2—2 of FIG. 1.
Figure 10:
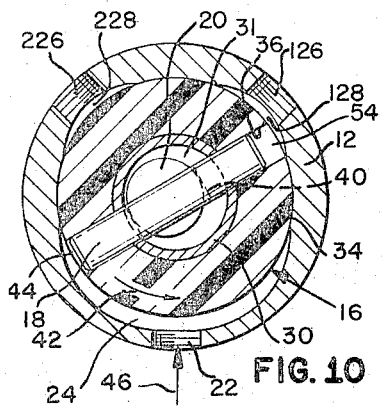
Figure 11:
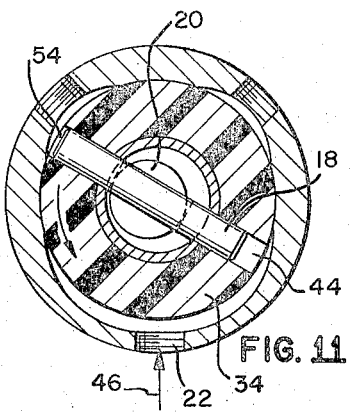
Figure 12:
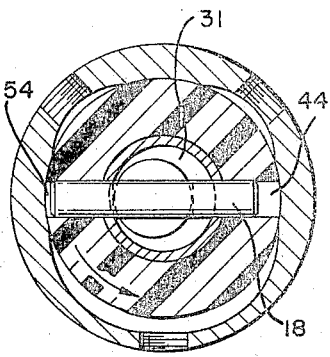

FIG. 2 is an enlarged view of a portion of cylinder 36 which shows a molded seal ring 38 projecting slightly inwardly of the inside diameter of cylinder 36. This seal ring 38 is preferably formed as an integral part of jacket 34 and acts to seal piston 18 which reciprocates in the cylinder 36. Piston 18, as best shown in FIG. 1, has a linear slot 40 whose width is substantially equal to the diameter of the eccentric pin or cam 20.

Figure 4:
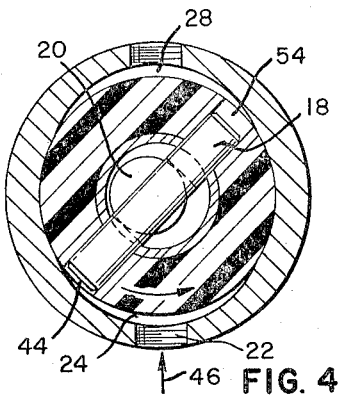

In operation, rotor 16 is turned by means of the drive shaft 32. As shown in FIGS. 4 through 9, the rotor is turning counterclockwise or in the direction of the arrow 42. In FIG. 4, the rotor 16 is shown in such a position that the chamber 44 formed by one end portion of cylinder 36 has just entered into communication with the leading end of the inlet port 24. As the roller 16 rotates from the position of FIG. 4 to that of FIG. 5, it is continuously in communication with the inlet port 24; and during this interval of rotation, the action of the pin 20 in slot 40 of piston 18 causes the piston 18 to rise within the cylinder 36. Consequently, during this rotational interval, the chamber 44 becomes larger and draws fluid into it from the port 24, to which fluid is supplied from an external source through passage 22 as indicated by arrow 46.

Figure 5:
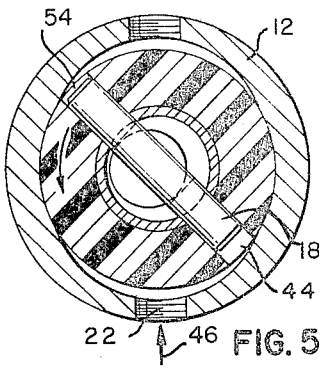
Figure 6:
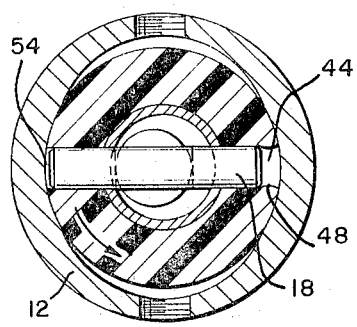

As the rotor 16 turns from the position of FIG. 5 to that of FIG. 6, the chamber 44 is sealed by the cylindrical portion of the wall of housing 12. The piston 18, however, continues to move toward the left within cylinder 36, until it reaches its leftmost position in the rotor position of FIG. 6. Inasmuch as the movement of piston 18 cannot draw any more fluid into the chamber 44 during the rotational interval between FIGS. 5 and 6, the volume of chamber 44 is kept constant by a slight inward bulging of the resilient walls of the jacket 34 (FIG. 1) of rotor 16. This inward bulging is actually extremely minute, but has been shown in exaggerated form at 48 in FIG. 6.

Figure 7:
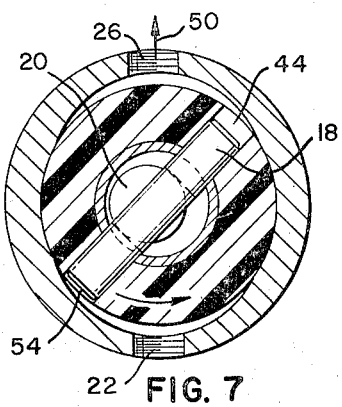

As the rotor 16 now continues its rotation from the position of FIG. 6 to that of FIG. 7, the piston 18 reverses its travel and now moves to the right. This rightward movement, which shows as an upward movement in FIGS. 7 and 8, causes the cavity 44 to become smaller while it is in communication with outlet port 28 between the positions of FIG. 7 and FIG. 8. Consequently, the fluid contained in chamber 44 is forced into the outlet port 28, from where it exits to an appropriate place of use through the outlet passage 26, as indicated by arrow 50.

Figure 8:
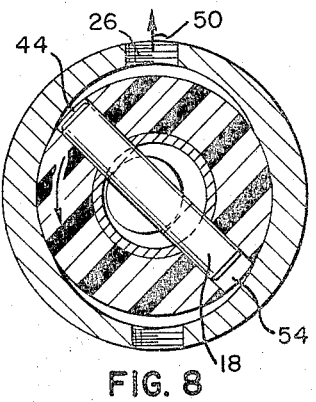
Figure 9:
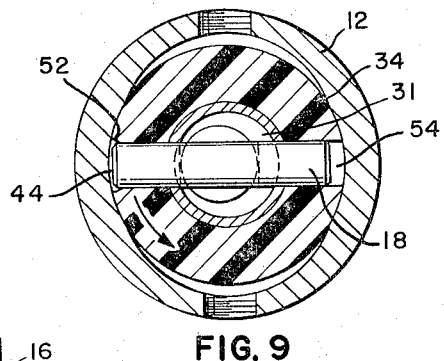

As rotor 16 turns from the position of FIG. 8 to that of FIG. 9, the cavity 44 is once again sealed while piston 18 still continues to move to the left. The resulting compression of the fluid in chamber 44 causes the walls of chamber 44 to bulge out resiliently as indicated in an exaggerated manner at 52. Inasmuch as the piston 18 begins to move to the right again when it has passed the position of FIG. 9, this bulge recedes as the rotation of motor 16 continues and disappears entirely when the rotor returns to the position of FIG. 4 to complete its cycle.

The pump of this invention is designed primarily for transfer purposes and not to develop high discharge pressures. Therefore, the fit of the resilient jacket 34 in the housing 12 and the fit of the piston 18 in the resilient walls of the cylinder 36 are sufficiently effective to permit use of the pump without the addition of check valves. The pump is also designed to be operated at extremely low speeds and with very little driving torque; and, therefore, the rotor 16 may also act as a bearing.

Modification

Figure 13:
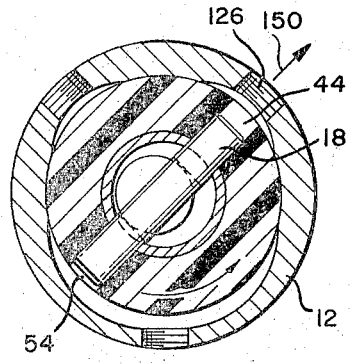

FIGS. 10 through 16 schematically illustrate the operational sequence of a modified embodiment of this invention. In this modified embodiment, the outlet passage 26 and outlet port 28 have been replaced, respectively, by a plurality of outlet passages 126, 226, and outlet ports 128, 228. The outlet ports 128 and 228 are separated from each other at the top of the device by a cylindrical portion of the wall of housing 12, which the rotor 16 engages in sealing relationship. Consequently, the outlet ports 128 and 228 are totally independent of one another and cannot communicate with one another. The functioning of the device in its modified version is the same as that previously described in connection with the single-outlet version. The only difference is that while the rotor 16 is in such a position that chamber 44 is in the quadrant in which it is shown in FIG. 13, fluid from the chamber 44 is discharged into outlet port 128, from where it is conveyed away through passage 126 as indicated by arrow 150.

Figure 14:
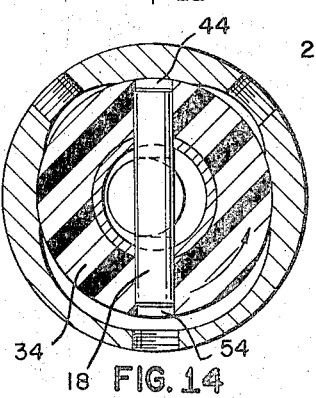
Figure 15:
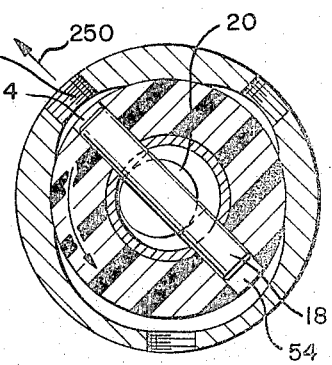
Figure 16:
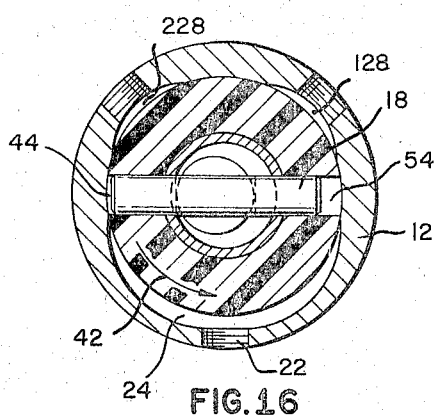

When the rotor 16 is in the position shown in FIG. 14, a transfer occurs in which the chamber 44 ceases to communicate with the port 128 and begins to communicate with port 228. Thereafter, while the rotor 16 is in a position such that the chamber 44 is in the quadrant in which it is shown in FIG. 15, the second half of the ejection stroke of piston 18 pushes fluid from chamber 44 through port 228 and passage 226 to a second point of use symbolized by the arrow 250.

It will be readily understood that if the cylinder 36 and piston 18 are two-ended as shown in the drawings, the chamber 54 goes through the same operational sequence as the chamber 44, but half a revolution out of phase with chamber 44.

Although the modified embodiment has been described herein with two outlet ports, each of which receives exactly half the total fluid quantity pumped, it will be readily apparent to those skilled in the art that more than two outlet ports may be provided, and that unequal quantities may be metered out to each of the outlet ports merely by varying the angular extent of the outlet ports. Likewise, two or more inlet ports may be provided in the same manner, e.g., for the pumping and mixing of two or more miscible ingredients. The configuration of the inlet and outlet ports in the device described is limited only by the fact that all ports located below the diameter D (FIG. 3) are inherently inlet ports, whereas all the ports above the diameter D are inherently outlet ports.

Inasmuch, as pointed out above, the teaching of the invention is not limited to the particular embodiment shown and described herein, I do not desire to be limited by the foregoing description, but rather only by the scope of the following claims.

What I claim and desire to secure by Letters Patent is:

1. A metering pump for pumping minute, accurately measured quantities of fluid at a very slow rate, comprising:

a housing having a near-cylindrical bore;

substantially cylindrical rotor means disposed in said bore in sealing engagement with the portions of said bore of least diameter, and cooperating with said housing to define at least one inlet port and one outlet port;

reciprocable piston means disposed in said rotor transversely to its axis and cooperating with said rotor to form cavities of variable volume at each end of said piston;

and means for continuously reciprocating said piston concurrently with the rotation of said rotor to increase the volume of said cavities in the vicinity of each said inlet port and decrease it in the vicinity of each said outlet port;

the portions of said rotor defining said cavities and adapted to seal against said housing being formed of resilient material so that the walls of said cavities may expandingly yield under the pressure imparted to fluid trapped in said cavities by the movement of said piston while said cavities are sealed off from said ports, expansion of said cavity walls forcing the resilient rotor surface material therearound into tighter sealing relationship with said housing to prevent any fluid leak from said cavities between ports in normal operation.

2. The device of claim 1, comprising a single inlet port and a plurality of separate outlet ports.

3. The device of claim 2, in which said outlet ports are spaced from one another circumferentially of said bore.

4. The device of claim 1, in which the ends of said piston are resilient.

References Cited by the Examiner

UNITED STATES PATENTS

| | | | |
|---|---|---|---|
| 1,442,195 | 1/1923 | Trane | 103—160 |
| 1,910,876 | 5/1933 | Appel | 103—160 |
| 2,277,991 | 3/1942 | Leonard | 103—160 |
| 2,510,903 | 6/1950 | Quiroz | 103—160 |
| 3,012,515 | 12/1961 | High | 103—160 |
| 3,075,286 | 1/1963 | McVicker et al. | 103—160 |
| 3,183,842 | 5/1965 | Sadler et al. | 103—117 |

MARK NEWMAN, *Primary Examiner.*

R. M. VARGO, *Assistant Examiner.*